United States Patent [19]

Baiker

[11] Patent Number: 5,099,715
[45] Date of Patent: Mar. 31, 1992

[54] VEHICLE GEAR BOX IN PARTICULAR FOR HEAVY AND SPECIAL VEHICLES

[76] Inventor: Walter Baiker, Chälenstrasse 2, 8433 Weiach, Switzerland

[21] Appl. No.: 701,643

[22] Filed: May 15, 1991

Related U.S. Application Data

[63] Continuation of Ser. No. 294,692, Dec. 8, 1988, abandoned.

[30] Foreign Application Priority Data

Apr. 2, 1987 [CH] Switzerland ............... 1266/87

[51] Int. Cl.$^5$ .............. F16H 57/04; F16H 57/02
[52] U.S. Cl. ................. 74/467; 74/606 R; 74/606 A; 184/6.12
[58] Field of Search ........... 74/467, 606 R, 606 A; 184/6.12

[56] References Cited

U.S. PATENT DOCUMENTS

| 3,146,629 | 9/1964 | Schmitter | 74/467 |
| 3,489,034 | 1/1970 | Moore | 74/606 R |
| 3,738,452 | 6/1973 | Hausinger | 74/467 |
| 4,484,491 | 11/1984 | Cocking | 74/606 R |
| 4,529,061 | 7/1985 | Glasrud et al. | 74/467 |
| 4,604,327 | 8/1986 | de Smet | 74/606 R |

FOREIGN PATENT DOCUMENTS

| 379441 | 1/1986 | Austria . | |
| 727085 | 9/1942 | Fed. Rep. of Germany | 74/606 A |
| 1147812 | 4/1963 | Fed. Rep. of Germany | 74/606 R |
| 3422043 | 12/1985 | Fed. Rep. of Germany . | |
| 3606963 | 9/1986 | Fed. Rep. of Germany | 74/467 |
| 368664 | 12/1906 | France | 74/606 R |
| 1194993 | 11/1959 | France . | |
| 1270470 | 11/1986 | U.S.S.R. | 74/467 |
| 1056209 | 1/1967 | United Kingdom . | |
| 2116645 | 9/1983 | United Kingdom | 74/467 |
| 2153018 | 8/1985 | United Kingdom | 74/467 |

Primary Examiner—Allan D. Herrmann
Assistant Examiner—David W. Laub
Attorney, Agent, or Firm—Walter C. Farley

[57] ABSTRACT

Method for lubricating vehicle gears, characterized in that the lubricating oil is injected directly into the areas to be lubricated by means of a plurality of injection elements (43) and the consumed oil is returned to said injection elements by means of a closed circuit (35, 37, 40, 43, 45, 47, 49), where defoaming and preparation takes place.

4 Claims, 3 Drawing Sheets

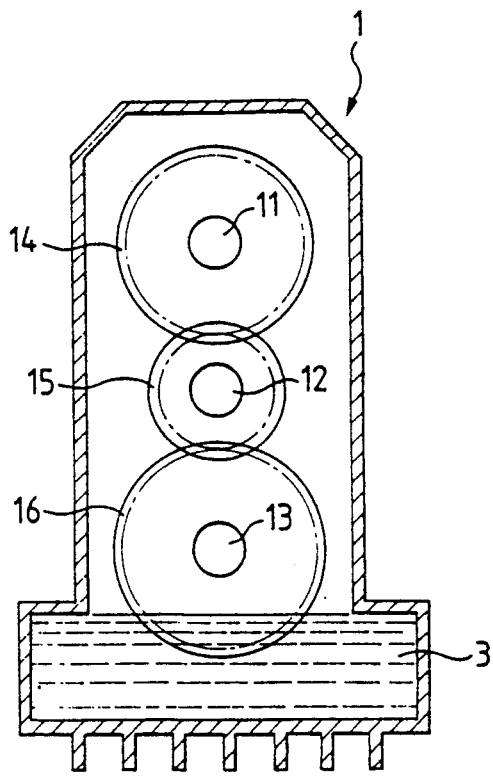
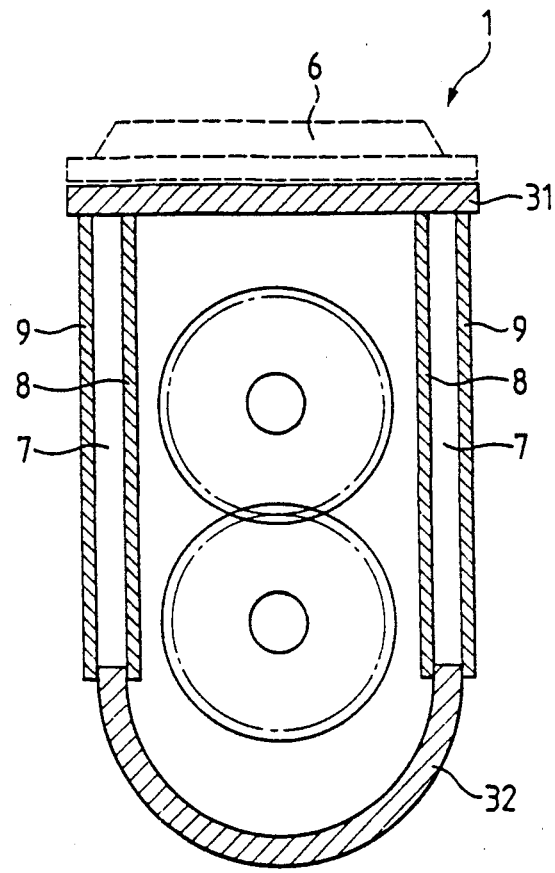
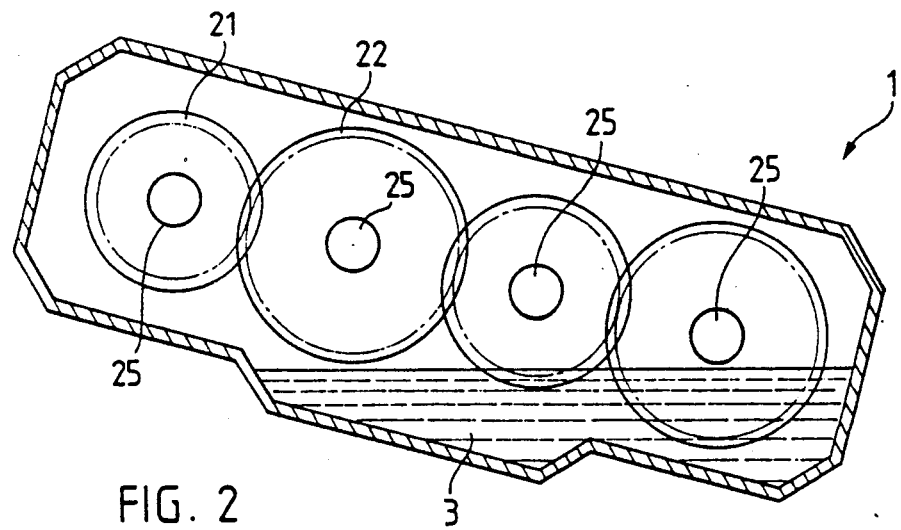
FIG. 1
FIG. 3
FIG. 2

VEHICLE GEAR BOX IN PARTICULAR FOR HEAVY AND SPECIAL VEHICLES

This is a continuation of U.S. Ser. No. 294,692 filed 12/8/88 now abandoned.

FIELD OF THE INVENTION

The invention relates to an apparatus for lubricating vehicle gears, in particular, to a vehicle gear case.

BACKGROUND OF THE INVENTION

Conventional changeover, transmission, distributor or axle gears generally comprise a cast metal case, which contains bearings, transmission shafts, couplings and gear wheels. Normally an oil bath is provided for lubricating the gear wheels and bearings, the gear wheels being immersed therein and whirled around. This system is appropriate for normal uses and vehicles. However, for large, modern special vehicles where ever higher engine performances are required, this gear technology is no longer adequate. Such high engine performances make it necessary to have much larger gears and therefore, apart from the disadvantage of the much greater space requirement, also lead to a significant weight increase. In particular, the increased space requirement is unacceptable, because the loading surface would then have to be higher, which would in turn lead to important disadvantages, such as e.g. unstable travelling behavior. The conventional gear lubrication method and the conventional construction procedure do not make it possible to reduce gear dimensions, even when using modern materials, which permit higher loading of the shafts, gear wheels and bearings. The reason for this is that if higher loads and pressures occur in the bearings and tooth profiles, there is a much greater heat evolution, because both on the bearing and on the gear transmissions losses occur, to which must be added the drag losses on friction tooth clutches and synchronous rings. A considerable amount of space is still required for the so-called oil sump, which can contain 30 to 60 and more liters of oil. The performance or power losses, which are all converted into heat, amount to 5 to 10% of the engine performance for changeover gears and 5 to 10% thereof for transmission and axle gears. For engines performing in the area of 500 kW, the undesired thermal output is approximately 50 to 80 kW. With such a heat loss 80 liters of oil are quickly heated to 150° C. and therefore a critical point is reached at which the gear is damaged. The vehicle must be stopped and cooling must take place for a considerable time before travelling on, during which time the vehicle constitutes a traffic obstacle. At higher pressures the cooling or lubrication power are no longer sufficient, even when several gear wheels are immersed in the lubricating oil. A higher filling of the gear box with oil does not remedy this, because then the gear wheels circulate the oil too strongly leading to additional power losses and additional heat production, so that the gear would be subject to even greater heating.

SUMMARY OF THE INVENTION

An object of the present invention is therefore to provide a method for the lubrication of vehicle gears which, using relatively small oil quantities and without an oil sump, is able to reliably lubricate and cool a gear even at high performance levels and even when using gears with relatively small dimensions permits continuous operation.

A further object of the invention is to provide a reliable, lightweight and non-wear-prone vehicle gear which, in the case of a relatively small gear box, can transmit high power without producing an unacceptable amount of heat and without unacceptable power losses impairing and rendering uneconomic the vehicle performance.

In the case of the inventive method for lubricating a vehicle gear the lubricating oil is injected directly by means of specifically arranged nozzles into the intermeshing tooth profiles and into the bearings, so that sufficient oil is supplied to the corresponding points. So that the gear wheels are not immersed in the oil and whirl the latter around as in a centrifuge, which would represent an additional high power loss, the oil is preferably forced out of the closed gear box by means of compressed air. It is introduced into an oil tank located at a selectable point, where the foam is removed and, if necessary, the oil is recooled in order to be supplied again to the nozzles as normal fresh oil by means of a pump and preferably by means of a filter located in the pressure line. This lubricating system makes it possible to transmit very high power levels without requiring gears which need a large amount of space and represent an excess or extra weight of hundreds of kilograms, which would necessarily reduce the working or useful load of the vehicle. The novel concept of an oil tank located outside the gear makes it possible to provide a larger oil supply without the known space problems occurring in connection with the gear, so that the durability of the gear is increased and the fault susceptibility of the gear lubricating system is reduced.

The vehicle gear according to the invention contains a double-walled gear box or case, which permits use in connection with the inventive lubricating method and leads to further advantages. Conventional cast iron gear boxes would only be able in the case of very heavy constructions to withstand the high loads of the bearing and torsional pressures. Very high bearing loads to be introduced into the gear walls occur as a result of the necessary high torques with cross-country vehicles having large types, particularly in gradients or over heavy terrain when it is necessary to drive in low gears. As a result of the novel construction of the gear box from thin, hardened metal plates in a double wall welding construction a very high rigidity is obtained for a very low weight, while the space requirements are limited due to the small external dimensions.

The cavities between the walls of the gear box are preferably filled with oil injected to the points to be lubricated by means of nozzles on the inner wall of the box. The cavity between the walls consequently simultaneously serves as an additional oil container, the oil therein being used for cooling the gear and also has the advantage that the noise occurring under high load is reduced.

BRIEF DESCRIPTION OF THE DRAWINGS

The invention is described in greater detail hereinafter relative to the non-limitative embodiments and the attached drawings, wherein:

FIG 1 shows a conventional distributor gear, such as is e.g. used for all-wheel drive vehicles;

FIG. 2 shows a horizontal four-shaft gear with the vehicle sloping to the right.

FIG. 3 shows a cross-section through a changeover gear with two shafts, in which for ease of representation reasons the gear box is shown partly in double-walled manner (side walls) and partly in singlewall manner;

DESCRIPTION OF THE PREFERRED EMBODIMENTS

The method for lubricating vehicle gears leads to important advantages particularly in conjunction with heavy and special vehicles, such as trucks, heavy military vehicles, mobile cranes, etc. and also offers new possibilities, but is also suitable for use in smaller vehicles. The vehicle gear according to the invention is more particularly described hereinafter relative to a changeover gear. However, it is pointed out that the inventive gear is suitable for all gear types used in conjunction with vehicles or similar machines.

Figure 5:
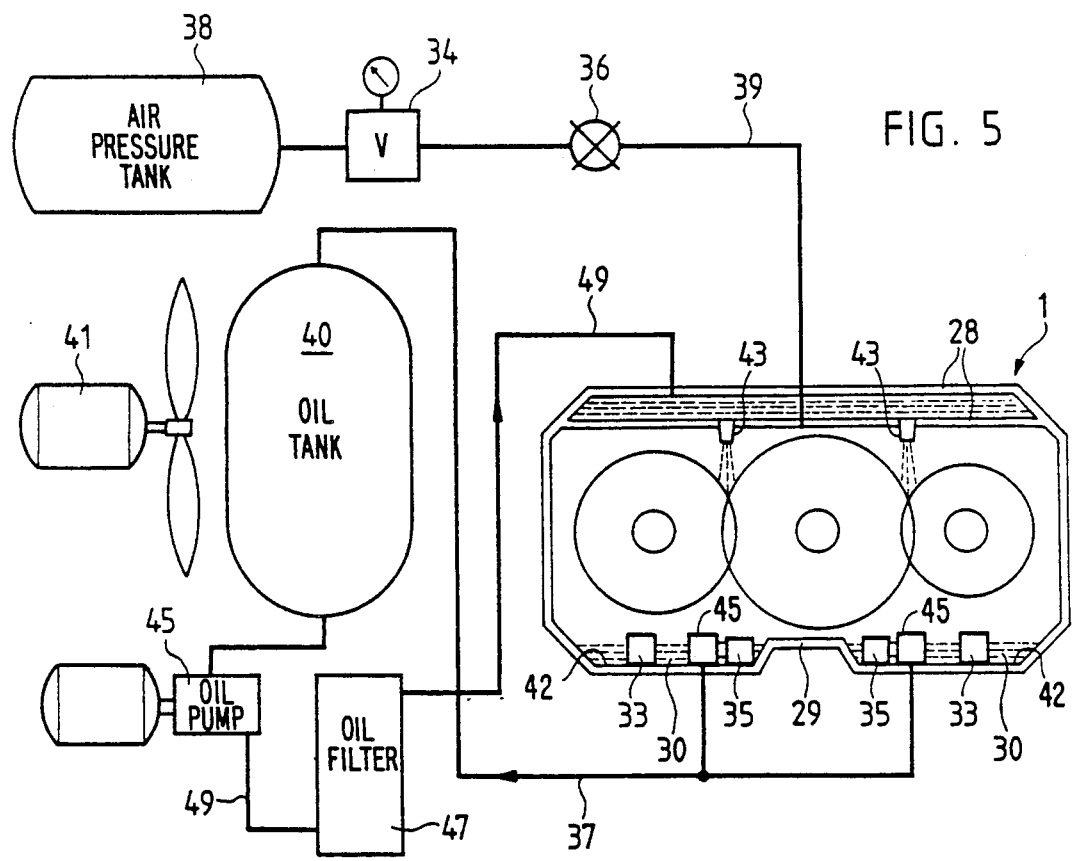
FIG. 5 shows a horizontal three-shaft gear according to the invention.

The inventive method for lubricating a vehicle gear does not use, as has hitherto been the case, a socalled oil sump for lubricating the gear but, instead, the lubricating oil is injected directly into the intermeshing tooth profiles and into the gears by means of specifically arranged nozzle 43 (FIG. 5). Therefore, the gear wheels are not immersed in the oil bath, so that the known energy losses with the resulting effect that the oil is whirled round as in a centrifuge do not occur. To ensure that no excess oil enters the gear box or case when the gear is inclined or when the vehicle is subject to vibrations, compressed air is preferably used to build up within the box an overpressure of 0.12 to 1 bar, as a function of the level of the external oil tank and the line resistances, so that the oil is forced out of the closed box at one or more points. This measure is normally necessary, because the oil tank is not generally placed directly below the gear and consequently the oil cannot automatically flow out. In order that the nonmetallic gasket rings on the box are not over-loaded, the pressure is preferably controlled. Compressed air is only allowed to pass into the gear if a certain oil quantity has collected on the bottom of the gear box, valves preferably being used for control purposes.

The simplest solution uses no valve and is realized in such a way that two superimposed capacitive proximity switches switching over with an internal or external lag or delay are used as level sensors. The double construction, i.e. two sensors instead of one, is chosen for redundancy reasons, so that the gear is not overfilled in the case of faulty performance of the control system. In the case of a wide, horizontal gear, in order to permit highly sloping positions, both box ends must have an oil drainage system. It is then also necessary to have a controlled discharge valve, so that propelling air present in the box cannot flow away or escape through a higher, oil-free outlet.

A valve 35 (FIG. 5), e.g. a solenoid valve or a compressed air-controlled control valve, which is fitted to the bottom of the inside of the gear box, opens as soon as the oil level exceeds a certain amount and the excess oil is pressed out of the box. By means of discharge lines 37 (FIG. 5), the oil is introduced into an oil tank 40 at a random location. Whereas the fresh oil supply takes place constantly, the oil is drained off by said control process in a gradual manner. Thus, even in the case of higher oil requirements, it is not necessary for the entire oil supply to be located in the gear case 1, so that the oil tank 40 can be positioned at a point of the vehicle structure where there is sufficient space. This makes it possible to provide a larger oil supply and to prepare the oil outside the gear during operation. Before supplying the oil again to the injection nozzles 43, the foam is removed and, if necessary, the oil is cooled. The oil is pumped out of the oil tank to the nozzles by means of a pump. Preferably a filter is fitted in the oil line or in special means and serves to filter contaminants from the oil, particularly the harmful metal abraded from the gear elements. The oil defoamed and cleaned in this way can thus be prepared during the use of the gear and can fulfill its lubricating function in an optimum manner. As the oil is continuously supplied to the gear in a fresh state, the gear life is increased as compared with conventional gear lubrication systems. The inventive lubricating system makes it possible to transmit very high power levels due to the separate arrangement of the oil tank, the careful lubrication of the gear and the avoidance of energy losses due to an oil centrifuge effect but without requiring a gear needing an excessive amount of space or having unacceptable weight.

FIG. 1 shows a conventional gear box or case 1 with a so-called distributor gear having three shafts 11,12, 13. These three superimposed shafts are provided with gear wheels 14, 15, 16. Such distributor gears are in particular used for trucks lorries, military vehicles, mobile cranes, bender tractors, forestry vehicles, etc. Only the bottom gear wheel 16 is immersed in oil bath 3. If the gear box 1 was half filled with oil, which would fundamentally be desirable in order to achieve adequate lubrication of the top gear wheel 14 and shaft 11, then a so-called oil centrifuge would occur. At a higher speed a gear designed in this way would have over 50% power losses, which would be converted into heat. Therefore conventional distributor gears are still based on the represented principle with an only limited immersion depth of the gear wheel, whereby it is necessary to accept that as a result of an inadequate lubrication the gear will be heated an is consequently subject to a high degree of wear. Therefore the gear wheels become worn, the gear starts to "hum" when travelling at speed and must finally be replaced.

FIG. 2 shows a conventional horizontal four-shaft gear. When the vehicle slopes to the right, gear case 1 also assumes a sloping position and correspondingly the oil flows to the right. Clearly the left-hand side gear wheels 21, 22 are no longer immersed in the oil bath 3 and are consequently no longer lubricated. Within a very short time this leads to damage and finally to the destruction of the gear. Such a lubricating method is clearly unsuitable for wide gears, in which the shafts 25 are arranged in a horizontal plane.

FIG. 3 shows an embodiment of an inventive, vertical changeover gear in cross-section. The gear case 1 is constructed in a substantially double-walled manner with an outer wall 9 and an inner wall 8. The double-walled lightweight construction greatly increases stability and makes case 1 torsionally stiff. Conventional cast iron gear boxes would not be able to withstand such high loads with limited deformations or would have to have unacceptably large dimensions. Walls 8, 9 are preferably made from hardened steel or light metal plates and are welded with joining elements 31, 32 and form with the latter the closed gear case. The broken line diagrammatically indicates a gear cover 6, into which can be integrated a not shown gear operating mechanism. The cavity 7 between outer wall 9 and inner wall 8 are filled with oil. The latter is injected by means of not shown nozzles into the interior of gear case 1 and at the corresponding points to be lubricated. The oil supply and discharge are also not shown. This construction of the gear case 1, in the case of relatively small weight and limited space requirements, permits high stability, even for high loads. The cavity between the walls serves as an additional oil reservoir and the oil present therein assists the cooling of the gear and also has the advantage of reducing the noise occurring under high load. These cavities 7, which serve as additional reservoirs with respect to the actual oil tank, make it possible to increase the oil supply, which leads to less frequent maintenance and, due to the higher oil quantity, to increased durability and increased insensitivity of the system.

Figure 4:
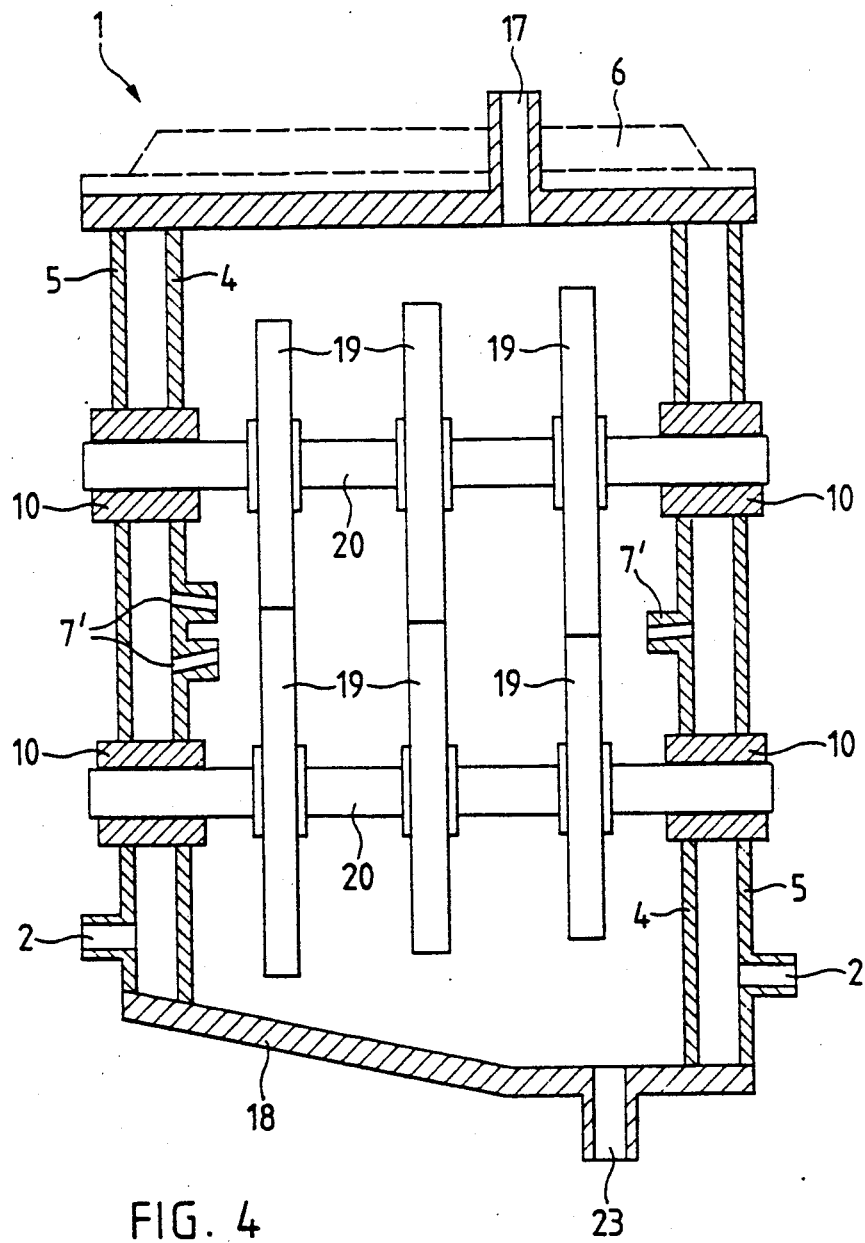
FIG. 4 shows a longitudinal section through a changeover gear according to FIG. 3.

FIG. 4 shows the aforementioned gear in longitudinal section. The vertically installed changeover gear is surrounded by a gear box or case 1, which is closed at the top by a gear cover 6. The front and rear of the gear case are formed by double walls with inner walls 4 and outer walls 5. Within said double wall 4, 5 are welded bearing bushes 10, in which are mounted shafts 20 and which simultaneously stiffen the said double wall 4, 5. Six gear wheels 19 are diagrammatically shown. A fixed displacement pump supplies fresh oil from the oil tank through two supply openings 2. The oil is injected directly into engagement with the gear wheels by several nozzles 7', which are directly located on or in the inner wall 4 or are integrated into the same. This robust arrangement of the nozzles ensures in a simple manner an operationally reliable injection of the oil at the necessary lubrication points. Simultaneously through the double wall construction and the inventively arranged nozzles 7', it is possible to avoid additional oil lines in the gear case. The oil cushions located in the cavity of double wall 4, 5 simultaneously have a cooling and noise reducing effect. By means of a discharge opening 23, the oil is returned by means of a line to the oil tank. Both the bottom 18 of the gear case and the gear cover 6 can be given double-walled construction for improving the stability. If necessary, compressed air is fed in via an opening 17 and within the gear case builds up pressure and presses the excess oil out through the discharge opening 23.

The cavities between the different double walls 4, 5 and 8, 9 (FIG. 3) can form separate chambers or can be interconnected, so that the oil can circulate freely in these cavities.

FIG. 5 shows a horizontal three-shaft gear, e.g. a horizontal distributor gear, such as is used for all-wheel vehicles. The gear case 1 is preferably welded from hardened sheet metal. The upper wall 28 is in doublewall form and consequently also serves as an oil container for cooling and noise reduction purposes. The front and back gear covers, which seal off the gear case and the shaft bearings integrated therein are not shown. They are also made using a doublewall construction as in FIGS. 3 and 4. The lower wall 29 has two depressions 42, each of which contains a sensor 33. These sensors 33 produce a change in their output voltage when the oil level rises in the depressions and this serves to control a solenoid valve 35. In the normal case, the sensor controls a compressed air solenoid valve which, by means of a nozzle with a diameter of 0.4 to 0.5 mm, allows compressed air to flow into the gearbox. The increased gearbox internal pressure speeds up emptying. Assuming the appropriate conditions, generally about 7 seconds after the immersion of the sensor, the compressed air solenoid valve is closed again. The inventive embodiment intended for very wide gears is under discussion here where, when travelling along a slope, the compressed air supply opened by the lower-lying sensor would merely flow out via the "dry", facing, higher opening and consequently the oil would merely be foamed.

Solenoid valve 45 then opens and the collected oil flows back via oil line 37 to oil tank 40. Tank 40 is cooled by a fan driven by a motor 41. This electrical pulse simultaneously controls a pneumatic valve 34 which opens and then the compressed air supplied via the pressure reducing valve 36 passes into the interior of the gear case 1.

The source of pressurized air is a pressure container 38, whose internal pressure is e.g. approximately 10 bar. This pressure can be reduced by the pressure reducing valve 36 to approximately 0.1 to 1 bar and the compressed air finally passes via a throttle member 39 to the gear case, where it is used for forcing out the collected oil. A small, directly or indirectly driven oil pump 45 or a slightly dammed up return means feeds the oil via a further oil line 49 to the gearbox. A fine filter 47 is interposed in said oil line 49 and is used for cleaning the lubricating oil.

The upper wall 28 of gear case 1 is provided on its inside with several nozzles 43 (variable bores) through which the lubricating oil is injected. In this way a closed oil circuit is formed, in which the consumed oil is defoamed, recooled, filtered and fed back in dosed manner to the gear.

In the case of high vehicle engine performances, particularly in long gradients or over heavy terrain, there is a risk of excessive heating of the gear. An excessively high oil temperature, which considerably reduces the lubricating capacity of the oil and has a disadvantageous effect on the gear function or wear, can be avoided by efficient cooling. For this purpose preferably a motor 41 with a fan is provided, which is switched on when necessary and cools the oil tank 40.

Figure 6:
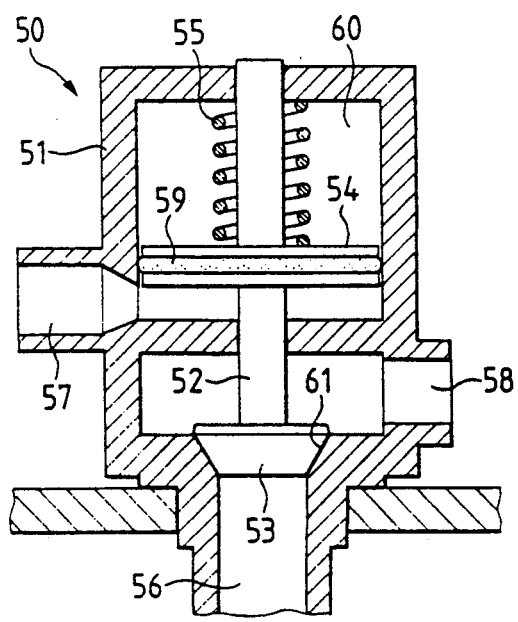
FIG. 6 shows a control valve for controlling the oil level in the gear box.

FIG. 6 shows a control valve for controlling the oil level in the gear case. The control valve 50 is suitable in optimum manner for this purpose and in very simple manner permits a reliable control. Control valve 50 is not controlled by current in the same way as the aforementioned solenoid valve 35 (FIG. 5) but instead operates with compressed air. A casing 51 contains a vertical shaft 52, which is fixed to a valve cone 53 located in the lower part of case 51. In the upper case region a piston 54 is fixed to shaft 52. The piston 54 contains on its periphery a gasket ring 59, which seals a chamber area 60. Above the piston 54 and in chamber area 60 is located a helical spring 55, which presses piston 54 downwards and therefore presses the valve cone 53 into valve seat 61 and consequently closes the oil discharge opening 56. On the left-hand side is provided an opening 57 through which the compressed air can enter. An oil inlet opening 58 in the lower case area permits the entry of oil. When using such a control valve in place of a solenoid valve 35 (FIG. 5), the oil level sensor 33 only controls the pneumatic valve 36. If the oil quantity in gear case 1 rises, then it leads to the opening of the pneumatic valve 36 and the pressure in the gear case rises to the necessary value. By means of the opening 57 in control valve 50, the pressure causes the piston 54 and also the valve cone to rise and oil can flow out to the oil tank 40 via the oil inlet opening 58 and oil outlet opening 56. This procedure continues until the oil quantity in the depressions 42 has dropped sufficiently and the sensors switch over. Oil then starts to collect again and after a few minutes there is again an outflow process. The reason why two separate outflow systems, which in each case have a sensor, a line and a valve are provided, is the slope of the gear resulting from travel. Unlike in the case of stationary operation it is possible for centrifugal forces to act (rapid cornering) and sloping positions can be adopted (particularly when travelling cross-country). The consumed oil is then non-uniformly distributed at the bottom of gear case 1, but only the outflow located below the oil level is to be opened. It is conceivable in the case of larger gears that more than two outflow systems may have to be provided.

Figure 7:
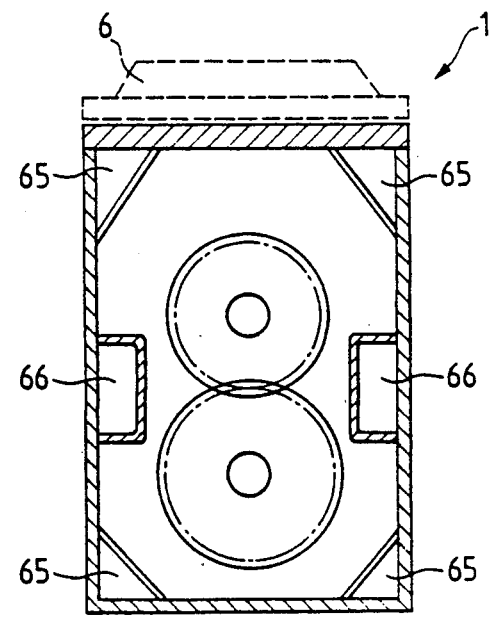
FIG. 7 shows another embodiment of the inventive gear in cross-section along a vertical plane.

FIG. 7 shows another embodiment of a vehicle gear case in cross-section. The gear case 1 is only partly constructed in double-walled manner. A gear cover 6 at the top of the gear is shown in broken line form. At the points exposed to torsion, steel plates or sheets are welded in for reinforcing the case 1. The resulting cavities 65, 66 can again be used to receive lubricating oil and also only certain of these cavities 65, 66 need be filled with oil. In the represented gear case, e.g. only cavity 66 on the side walls are filled with oil.

In place of a pressure system, which presses the excess oil out of the gear case, a suction means can also be provided. The oil can then be sucked off permanently or in sensor-controlled manner at regular intervals and can be returned by means of a closed circuit system to the injection nozzles.

In order to protect the gear against overheating through oil deficiency or an excessively high oil level, in which heat could be produced by an oil centrifuge effect, sensors can also be provided in the gear, which supply optical or acoustic warning signals in the driver's cab.

What is claimed is:

1. A gear case for trucks and the like comprising the combination of first and second substantially parallel, spaced-apart, sheet-metal, inner side walls;

first and second substantially parallel, sheet-metal, outer side walls spaced from said inner side walls, said outer side walls enclosing said inner side walls, thereby defining lubricant containers therebetween;

top and bottom walls and third and fourth side walls attached to said inner walls to define an interior volume;

a plurality of interengaged gear wheels and a plurality of gear shafts carrying said wheels in said interior volume;

a plurality of bushings arranged in pairs on opposite sides of said interior volume to rotatably receive ends of said gear shafts extending across said interior volume, each said bushing being fixedly attached to and extending between an inner and outer side wall to support said shafts and to rigidly interconnect said spaced inner and outer side walls; and means on said first and second inner side walls defining injection elements for delivering oil from said lubricant containers onto said gear wheels in said interior volume to lubricate said gear wheels.

2. A gear case according to claim 1 wherein said bottom wall includes oil outflow means, said case further having a closed oil circuit connected to said oil outflow means for returning oil from said interior volume to said containers.

3. A gear case according to claim 2 and including means for producing an overpressure in said interior volume for forcing out used oil from the bottom thereof, said overpressure system including a pressure container (38) and a pressure line connecting said pressure container to said interior volume.

4. A gear case according to claim 1 and including a compressed air system for producing pressure in said gear case for forcing out used oil, said compressed air system including a pressure container (38) and a pressure line (39) connecting said container to the interior of said case, said pressure line including a reducing valve (34) and a pneumatic valve (36) for controlling flow of air under pressure to said case, said case further including a sensor (33) for controlling said pneumatic valve.

* * * * *